(12) United States Patent
Fischman et al.

(10) Patent No.: US 7,293,287 B2
(45) Date of Patent: Nov. 6, 2007

(54) METHOD AND SYSTEM FOR MODELING, ANALYSIS AND DISPLAY OF NETWORK SECURITY EVENTS

(75) Inventors: Reuben S. Fischman, Taunton, MA (US); Adam Payne, Franklin, MA (US)

(73) Assignee: General Dynamics C4 Systems, Inc., Taunton, MA (US)

( * ) Notice: Subject to any disclaimer, the term of this patent is extended or adjusted under 35 U.S.C. 154(b) by 903 days.

(21) Appl. No.: 10/279,330

(22) Filed: Oct. 24, 2002

(65) Prior Publication Data

US 2003/0097588 A1    May 22, 2003

Related U.S. Application Data

(60) Provisional application No. 60/344,404, filed on Nov. 9, 2001, provisional application No. 60/342,887, filed on Oct. 25, 2001.

(51) Int. Cl.
*H04L 29/00* (2006.01)
(52) U.S. Cl. .............................. 726/22; 726/26; 726/24; 709/223; 709/224
(58) Field of Classification Search ..................... None
See application file for complete search history.

(56) References Cited

U.S. PATENT DOCUMENTS 5,528,516 A    6/1996 Yemini et al.

(Continued)

FOREIGN PATENT DOCUMENTS

WO    WO 01/59989 A2    8/2001

OTHER PUBLICATIONS

"SMARTS Delivers End-to-End Integrated Problem Diagnosis and Impact Analysis for Networks, Systems and Applications", Business Wire, Sep. 1999, Retrieved from the Internet on May 30, 2006 <URL: http://proquest.umi.com/pqdweb?did=44467721&sid=4&Fmt=3&clie ntld=19649&RQT=309&VName=PQD>.*

(Continued)

*Primary Examiner*—Gilberto Barron, Jr.
*Assistant Examiner*—Minh Dinh
(74) *Attorney, Agent, or Firm*—Ingrassia Fisher & Lorenz, P.C.

(57) ABSTRACT

A method and system is disclosed for cross-correlating information between the domains of network management and network security. The present invention discloses a model representing the security domain that can be used to define relationship between devices and events in the security domain in the context of a managed network. With this model, a security topology of the network security domain can be created based on the current implementation of the network. This model and topology allows the present invention to correlate relevant network security information to diagnose problems as they occur by using events detected within the network. Using the disclosed method and system for correlating information in the network security, the present invention provides further enhancements over conventional methods by cross-correlating information between the network security and network management domains to aid in their detection and analysis of problems. Cross-correlating information across network security and network management domains enhances the ability of the present invention to diagnose problems that may arise in the network to allow an operator to get a more complete view of the system with minimal effort.

21 Claims, 4 Drawing Sheets

U.S. PATENT DOCUMENTS

| | | | |
|---|---|---|---|
| 5,661,668 A | 8/1997 | Yemini et al. | |
| 6,249,755 B1 | 6/2001 | Yemini et al. | |
| 6,430,712 B2* | 8/2002 | Lewis | 714/47 |
| 6,957,186 B1* | 10/2005 | Guheen et al. | 705/1 |
| 7,007,104 B1* | 2/2006 | Lewis et al. | 709/246 |
| 7,020,697 B1* | 3/2006 | Goodman et al. | 709/223 |
| 7,047,423 B1* | 5/2006 | Maloney et al. | 345/473 |
| 7,096,502 B1* | 8/2006 | Fox et al. | 726/25 |
| 2003/0051026 A1* | 3/2003 | Carter et al. | 709/224 |

OTHER PUBLICATIONS

"Computer Dictionary", 1997, Microsoft Press, Third Edition, p. 457.*

Wood, "Network Management Systems and Information Security", Proceedings of COMPSEC International 1993, Oct. 1993, pp. 423-431.*

Flanagan, Java in a Nutshell, 1999, O'Reilly, 3rd Edition, pp. 95-98.*

IMail Server for Windows NT—User's Guide, Ipswitch, Inc., Jan. 1999, Retrieved from the Internet on Mar. 18, 2007: URL: <http://support.rapidsystem.net/dedicated/imail5.pdf>.*

* cited by examiner

METHOD AND SYSTEM FOR MODELING, ANALYSIS AND DISPLAY OF NETWORK SECURITY EVENTS

CROSS-REFERENCE TO RELATED APPLICATIONS

This application claims priority from U.S. Provisional Patent Applications Ser. No. 60/342,887, filed on Oct. 25, 2001; and No. 60/344,404, filed on Nov. 9, 2001.

BACKGROUND OF THE INVENTION

1. Field of the Invention

The present invention relates to the field of network security, and, more particularly, a method and system for performing comprehensive network fault analysis by cross-correlating network security information and network management information.

2. Description of the Related Art

Computer networks and related systems produce a tremendous amount of information related to network security. Analysis of this security information as well as information related to network management is needed for network security purposes. Originally, networks had few automated functions. A human operator was generally responsible for providing network security. As networks became more complex, it became more difficult for an operator to effectively provide security. Therefore, it has long been desired to develop tools to aid operators and administrators in securing the network. Generally, tools of this nature only focused on a single domain, for example, either network management or network security. Because many tools only focus on information provided within the realm of one domain, they may supply information which inaccurately or incompletely describes the state of the network as a whole. Although generally related to relatively different domains, information from the network management domain may impact the analysis of information in the network security domain and vice versa. Thus, there is a need to cross-correlate information between tools monitoring the network security and network management domains for a more accurate and comprehensive understanding of overall network status. But because conventional methods, in their respective domains, are not necessarily compatible with each other, there is also a need to develop techniques for correlating information in the network security domain that are compatible with the conventional methods already developed for network management.

In addition, network management tools have typically advanced at a more rapid pace than security tools. There is a wide variety of conventional software products available that aid an operator in managing a network. For example, a system might have network management software that would alert the operator when a component was malfunctioning. Some other conventional methods use more sophisticated fault analysis tools such as event correlation and root cause analysis tools (for example, rule-based reasoning, case-based reasoning, generic models, probability networks, model-based reasoning) to aid in automating management of a network. However, many existing methods have not proven to be an adequate solution for modern systems because they lack extensibility, have performance difficulties in some systems, may have large storage requirements, need to be constantly updated/configured, and are unable to compare information across domains.

One fault analysis solution that has applied event correlation to the network management domain is described in U.S. Pat. Nos. 5,528,516, No. 5,661,668, and No. 6,249,755. These patents disclose a method and system for fault analysis using event correlation with a causality matrix to solve the problem of fault isolation. Those patents describe using an object-oriented model of a managed network domain to develop a separate network topology for the physical system that relates the managed network devices to each other. In the method described in those patents, symptoms, problems, and their propagation through the system can be described for individual device types, independent of their configuration in a particular environment. One object-oriented model that has been applied to network management is the Common Information Model (CIM) from the DMTF (Distributed Management Task Force) industry consortium, which describes the generic physical and logical devices and their components in an enterprise network, and their relationships to each other. However, CIM does not suggest using the model for network security events.

While many conventional solutions have been developed in the domain of network management, comparable solutions have not been developed for the domain of network security. Network security tools, such as encryption, firewalls, and intrusion detection systems, usually address specific security issues. Few conventional methods exist for correlating information between these security tools, and those that currently exist are generally married to the proprietary solutions of a particular vendor. Typical correlation methods collect messages such as those generated using Simple Network Management Protocol ("SNMP") from the various tools and display them on a common user interface. These conventional methods rely on the operator to correlate much of the information manually to determine its significance, and may not be sophisticated enough for the complexity and volume of information in some modern systems. One example of security information messages between network security tools is the Internet Engineering Task Force Intrusion Detection Message Exchange Format ("IDMEF"), which attempts to define a common format for intrusion messages among heterogeneous vendors. The IDMEF standard does not suggest, however, an object model for representing network security events that would allow correlation of network security events. Thus, there is a need for better and more automated correlation of information in the domain of network security.

Because the domains of network management and network security may be closely related, information from the security domain may affect the network management analysis and vice versa. Because of the limited view provided by existing fault analysis tools, fault recovery in either domain may be based on incomplete or inaccurate information. The severity of a security event can only be evaluated in the context of the network in which it occurs. For example, something as trivial as a DNS zone transfer may be perceived as a threat in the security domain by a simple security tool. Such a transfer may be acceptable, expected behavior, if it takes place within the protected network, between primary and secondary DNS servers. Alternately, it may simply be a mis-configured DNS server, in which case this observed "security symptom" is of more use to the network managers who must reconfigure the server. Finally, it may indeed be a security threat, if the zone transfer information is leaving the protected network enclave, and being collected by a malicious agent on the Internet, for example. Thus, there is a need to develop a fault analysis tool to correlate information in the network security domain that is compatible with an advanced network management method to allow for cross-correlation of information between the network management domain and the network security domain to provide a more comprehensive analysis of a system.

SUMMARY OF THE INVENTION

The present invention is a tool designed to work with existing devices and applications to provide a more complete and accurate view of an entire managed network by cross-correlating information between the network security and network management domains. To accomplish this, the present invention describes a technique for analyzing network security that is compatible with conventional network management techniques by creating an object-oriented model for representing network security events in the context of managed networks. The present invention discloses an object-oriented model of the network security domain which can illustrate the relationships between security events, security devices and other security domain components. The network security model of the present invention also can illustrate the relationship between the objects in the network security model and objects in a network management model representing network management domain components. The present invention can create a security topology by instantiating specific instances of the objects defined in the network security model. Using the security topology, the present invention describes a system and a method for cross-correlating information between the network management and network security domains, including relating the security topology to the network topology. By cross-correlating network management information with network security information, the present invention provides a common operational view of the network and security domains that allows for comprehensive awareness and control of the system. The present invention takes advantage of the commonality between the network management and security domains, which are usually viewed in isolation, to give a unified view to an operator or administrator, and to perform automated functions without sacrificing the capabilities of the underlying tools.

Cross-correlation is a mechanism by which the fault analysis tools for different domains each independently diagnose their own areas of responsibility, but information from one domain is compared with information from the other domain to provide a higher level true root cause for the detected problem(s). Often times, an event in one domain may appear to be trivial or innocuous, but when combined with the knowledge of another domain, takes on a more significant or serious meaning. For example, a mail service failure is a trivial problem from a network management perspective, as an administrator would simply restart the service or the host platform on which the service runs to correct the failure. However, when considered along with knowledge of the security domain, information that indicates that a mail server disabled as the result of an attack gives the problem a whole new level of severity, and can grossly affect the course of action that may be taken to solve the problem. Under these circumstances, simply restarting a host platform, as in the example above, could be disastrous from a security perspective, as it could eliminate vital forensic information for attack analysis. Also, knowledge of the type of attack and the type of target, combined with knowledge of the network topology, can indicate which similar targets on the same or other networks may be vulnerable to the same attack. Based on this combined information, administrators can be warned of vulnerabilities so that pre-emptive measures can be taken.

The present invention also can automate many of the functions previously performed manually by an operator. In addition, the present invention, with knowledge of the physical network topology and security topology, can utilize information relating to any device present in the system. Thus, the present invention provides an operator with comprehensive information in a manner of presentation that would aid them the most, such as the hierarchical relationship between different components. Generally, the present invention provides a more complete analysis of the system than conventional tools and methods.

Figure 1:
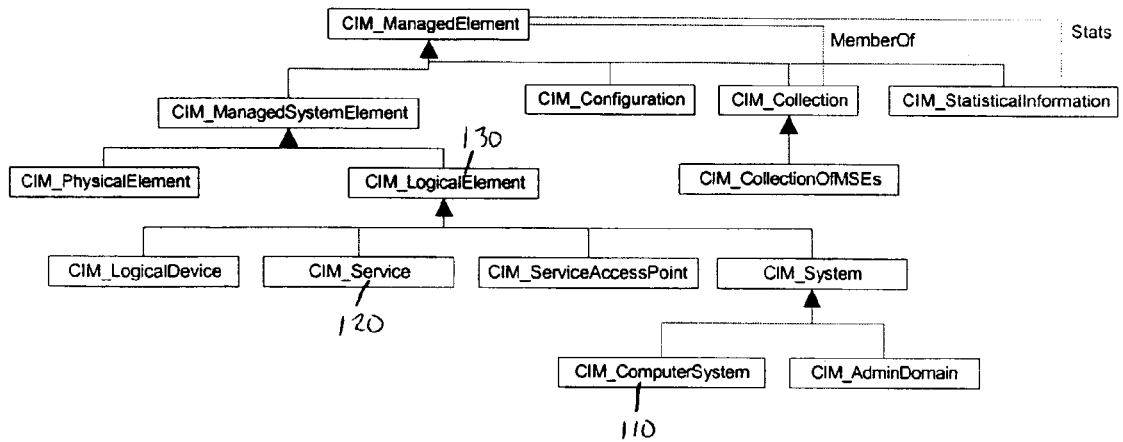
FIG. 1 is a block diagram of the Common Information Model network management core object model.

An embodiment of the present invention includes a tool designed to work with existing devices and applications to provide a more complete and accurate view of an entire managed network by cross-correlating information between the network security and network management domains. To accomplish this, an embodiment of the present invention describes a technique for analyzing network security that is compatible with conventional network management techniques by creating an object-oriented model for representing network security events in the context of managed networks. An embodiment of the present invention discloses an object-oriented model of the network security domain which can illustrate the relationships between security events, security devices and other security domain components. The network security model of an embodiment of the present invention also can illustrate the relationship between the objects in the network security model and objects in a network management model representing network management domain components. An embodiment of the present invention can create a security topology by instantiating specific instances of the objects defined in the network security model. Using the security topology, an embodiment of the present invention describes a system and a method for cross-correlating information between the network management and network security domains, including relating the security topology to the network topology. By cross-correlating network management information with network security information, an embodiment of the present invention provides a common operational view of the network and security domains that allows for comprehensive awareness and control of the system. An embodiment of the present invention takes advantage of the commonality between the network management and security domains, which are usually viewed in isolation, to give a unified view to an operator or administrator, and to perform automated functions without sacrificing the capabilities of the underlying tools.

Cross-correlation is a mechanism by which the fault analysis tools for different domains each independently diagnose their own areas of responsibility, but information from one domain is compared with information from the other domain to provide a higher level true root cause for the detected problem(s). Often times, an event in one domain may appear to be trivial or innocuous, but when combined with the knowledge of another domain, takes on a more significant or serious meaning. For example, a mail service failure is a trivial problem from a network management perspective, as an administrator would simply restart the service or the host platform on which the service runs to correct the failure. However, when considered along with knowledge of the security domain, information that indicates that a mail server disabled as the result of an attack gives the problem a whole new level of severity, and can grossly affect the course of action that may be taken to solve the problem. Under these circumstances, simply restarting a host platform, as in the example above, could be disastrous from a security perspective, as it could eliminate vital forensic information for attack analysis. Also, knowledge of the type of attack and the type of target, combined with knowledge of the network topology, can indicate which similar targets on the same or other networks may be vulnerable to the same attack. Based on this combined information, administrators can be warned of vulnerabilities so that pre-emptive measures can be taken.

An embodiment of the present invention also can automate many of the functions previously performed manually by an operator. In addition, an embodiment of the present invention, with knowledge of the physical network topology and security topology, can utilize information relating to any device present in the system. Thus, an embodiment of the present invention provides an operator with comprehensive information in a manner of presentation that would aid them the most, such as the hierarchical relationship between different components. Generally, embodiments of the present invention may provide a more complete analysis of the system than conventional tools and methods.

DETAILED DESCRIPTION OF THE PREFERRED EMBODIMENT

The disclosures of U.S. Provisional Patent Applications Ser. No. 60/342,887, entitled System and Method for Correlation, Analysis and Display of Network Status and Security Events, filed Oct. 25, 2001, and No. 60/344,404, entitled System and Method for Correlation, Analysis and Display of Network Status and Security Events, filed Nov. 9, 2001, both naming Reuben S. Fischman and Adam Payne as inventors, are hereby incorporated herein by reference.

The purpose of the present invention is to enhance the operation of a network by providing a more complete view of the network than provided by conventional methods. The present invention accomplishes this by cross-correlating information between the network security and network management domains. To efficiently cross-correlate between these domains, these domains preferably should have efficient and compatible methods for correlating information within their respective domains. An efficient method for correlating information has been previously developed for the network management domain. The preferred embodiment correlates information in the network management domain by leveraging the open-standard Common Information Model, shown in FIG. 1, to create a network management domain topology. One commercial application that implements this DMTF CIM is SMARTS InCharge by System Management Arts Inc., of White Plains, N.Y., which defines appropriate models for network devices corresponding to CIM. The SMARTS InCharge application uses codebook/causality matrix technology and can build a network topology. A detailed description of the InCharge application, the codebook/causality matrix and its application to the network management domain can be found in U.S. Pat. Nos. 5,528,516, No. 5,661,668, and No. 6,249,755, the disclosures of which are herein incorporated by reference.

Because a comparable method is not available for network security, the present invention creates a network security model based on the CIM approach to object-oriented representations and relationships. The preferred embodiment accomplishes this by defining an object-oriented model of the security domain that maps out the relationship between security events, devices and other network security domain components in the context of a managed network. Although the preferred embodiment currently defines the network security model in the SMARTS InCharge event correlation tool, the present invention will work with any fault analysis tool that models network components based on the CIM, or any other object-oriented network management model that is capable of being extend to domains outside of network management.

Once a security model has been created, the preferred embodiment creates a security topology of the network by instantiating specific instances of the objects in the security model to represent the security architecture, and additional objects as security events occur. In a similar fashion to the SMARTS InCharge technology, this security topology can be used to correlate information in the network security domain. Because the preferred embodiment is using compatible approaches for network security and network management correlation, the present invention can provide an even more comprehensive view of the entire managed network. Security managers using the present invention can have visibility into the status of the network, and network managers using the present invention can have visibility into the security posture of the network. In addition to visibility, information between these domains can be cross-correlated to automatically provide a more complete analysis into the status of the network for various viewpoints.

The present invention is not just another specific tool to detect events, but rather a modular method for correlating and analyzing all of the available information and events in the network, and providing a combined network and security status picture. This is accomplished by developing a novel method for correlating network security information and utilizing existing network management correlation capabilities to cross-correlate information in a security topology with physical devices in a conventional network topology. In the preferred embodiment, a network security fault analysis tool is used to implement the present invention. The network security fault analysis tool of the preferred embodiment would typically reside within a system similar to a network management tool and would perform the network security correlation functions and the cross-correlation of information between the network management and network security domains. Of course, the software applications that comprise the network security fault analysis tool, network management tool and cross-correlation tools could reside on different physical computers and communicate information electronically.

1. The Security Model

Figure 2:
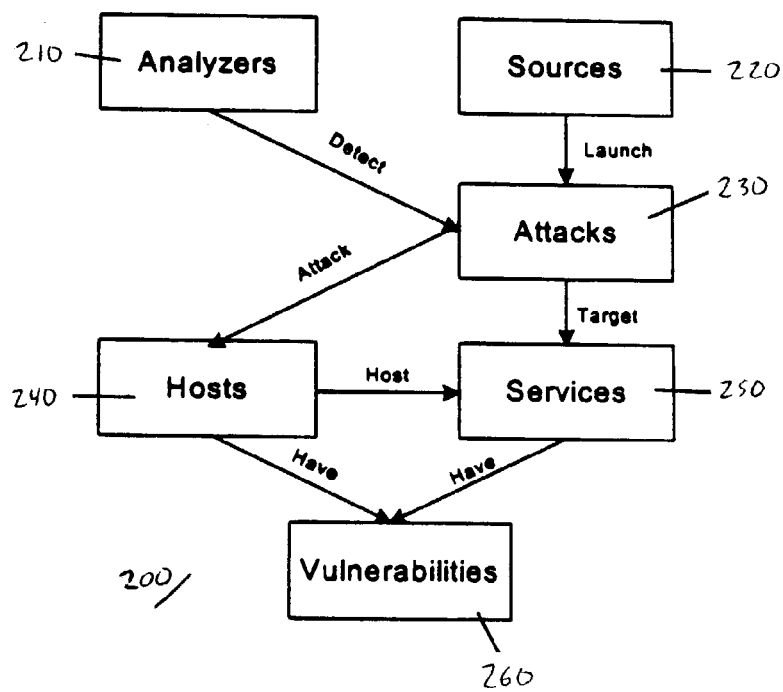
FIG. 2 is a block diagram of a high-level security model in an embodiment of the present invention.

In the present invention, a network security model is defined to relate security information (security events, devices, policies, and other network security domain components) to one another and to relate them to a managed network. A high-level security model 200 representing the generic relationships between elements in a network security event in the preferred embodiment is shown in FIG. 2. Model 200 is similar to the CIM and describes the generic elements and interactions of a security domain. Model 200 is an object-oriented model for describing and sharing the management information in a network system. Model 200 illustrates several security objects and their relationships to one another, as described below. From this model, the present invention can build a security topology for the domain of network security. Preferably, this model is an object-oriented model defining the relationship between security events, security devices, policies, and other security domain components in the context of a managed network.

The focus of the network security model of the present invention is an attack 230. FIG. 2 shows the relationship of the attack 230 to the analyzer 210 which detected the attack 230, the malicious source (internal or external) 220 which launched the attack 230, and the specific host(s) 240 and/or service(s) 250 that the attack 230 targets and affects. Analyzers 210 (also known as sensors) are the elements that represent the tools used to gather information, for example, intrusion detection systems that can detect attacks. Elements that can comprise this group include traffic analyzers, firewalls, and intrusion detection sensors. Sources 220 represent the attacker(s), which may be any source that would launch an attack, such as an outside individual, a foreign computer, or a misused or compromise internal asset. Typical examples of an attack 230 could be a virus, denial of service, unauthorized access, etc. Attacks 230 can include different types of attacks which have different relationships with different parts of the system. Hosts 240 represent the components of the system which host services 250 while services 250 represent particular services that may be targeted by an attack 230. Servers, end-user computers, and network printers are all examples of possible hosts 240. A particular service 250 may be located on several different hosts. Examples of services 250 may include e-mail, printing, or file transfers. Vulnerabilities 260 represent the weaknesses that a host 240 or service 250 may have, such as physical limitations (e.g. denial of service), bug(s) in the programming, or inadequate security.

Figure 3:
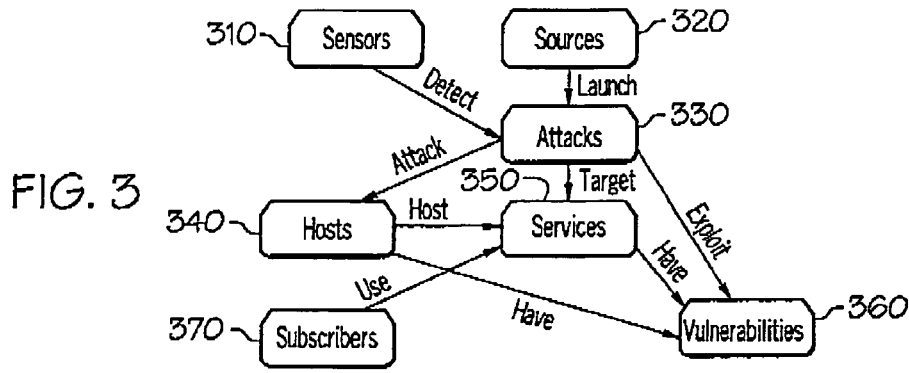
FIG. 3 is a block diagram of a high-level security model in another embodiment of the present invention.

FIG. 3 shows another embodiment of a high-level generic network security model of the present invention. Similarly to FIG. 2, attacks 330 launched by sources 320 attack hosts 340 and target services 350 and are detected by sensors 310 (also known as analyzers). Vulnerabilities 360 represent the weaknesses that a host 340 or service 350 may have. Subscribers 370 represent the end users of the attacked service 350.

In order to create a specific network security object model, the preferred embodiment extends the CIM model to the network security domain, although the present invention will work with any object-oriented network management model that is capable of being extended. The CIM model represents an industry standard modeling structure that provides a means to model objects in a network and to build relationships between entities. The preferred embodiment extends the CIM Specification Version 2.2, including its Core model and relevant schemes such as Network, Policy and System, as would be known to one skilled in the art. FIG. 1 represents a class diagram of the standard CIM Core model. Computer systems 110 and services 120 are represented as sub-classes of logical elements 130 in a network.

Figure 4:
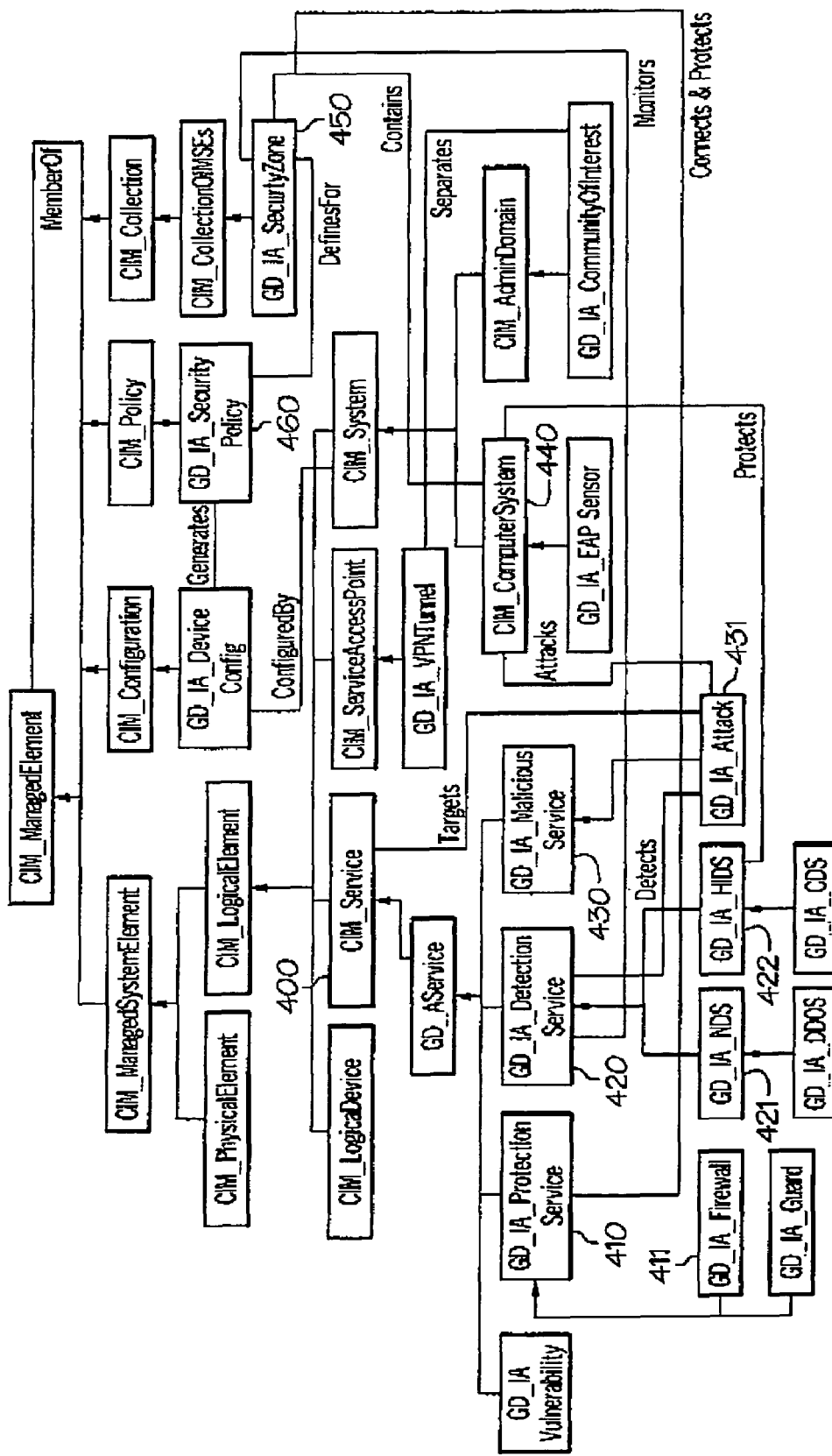
FIG. 4 is a block diagram of a sample Security Information Model network security object model according to the present invention.

FIG. 4 shows one embodiment of a detailed network security object model in accordance with the present invention. Those skilled in the art would be able to construct different detailed object models based on the generic components and relationships identified in FIG. 2. The generic components and relationships of the network security model identified in FIG. 2 are specifically implemented by creating new sub-classes from the CIM Core model of FIG. 1. For example, malicious services 430 corresponding to attacks 230 of FIG. 2 are defined as a sub-class of the CIM_Service class 400. Defining an attack 230 as a service 400 in the CIM model allows the present invention to take advantage of the underlying relationships in the CIM model. Specific types of attacks 431 are defined as sub-classes of the malicious service 430 and are hosted on the computer systems 440, corresponding to the hosts 240 of FIG. 2, or services 400, corresponding to services 250 of FIG. 2, which the attack 431 attacks or targets, respectively. Network security-specific devices such as firewalls 411 and intrusion detection systems 421, 422 may be sub-classed to represent the protection service 410 and detection service 420 that the devices provide, corresponding to the generic analyzers 210 of FIG. 2. The Network IDS ("NIDS") 421 and Host IDS ("HIDS") 422 intrusion detection systems represent sub-classes of detection services 420. Specific detection services 420 that detect specific attacks 431 are a Distributed Denial of Service ("DDOS") network sensor 423, representing a specific NIDS 421, and a host-based Change Detection Sensor ("CDS") 424, representing a specific HIDS 422.

Because the preferred embodiment creates its network security elements as extensions of the CIM model, the preferred embodiment can use the underlying CIM relationships to ascertain the interdependencies and impacts of successful and in-progress attacks 431. For example, an attack 431 can be associated with all of the related alerts from the various detection devices represented as detection services 420 throughout the network. Because the security model is an extension of the CIM model used for network management, the security model also allows security events to be related to devices in the network model to allow correlation between the network security domain and the network management domain.

Additionally, FIG. 4 defines the concept of a security zone 450. A security zone 450 allows for a collection of nodes to be containerized into a security enclave. For example, a network monitored by an embodiment of this invention may have an internal security zone consisting of computer systems 440 inside a firewall 411, computer systems 440 in a demilitarized zone (DMZ) (not shown), and computer systems 440 external to the firewall 411. A detection service 420 such as a NIDS 421 can be associated with a security zone 450. A firewall 411 can connect and therefore be associated with multiple security zones 440. Policies 460 can be defined for specific security zones 450.

Figure 5:
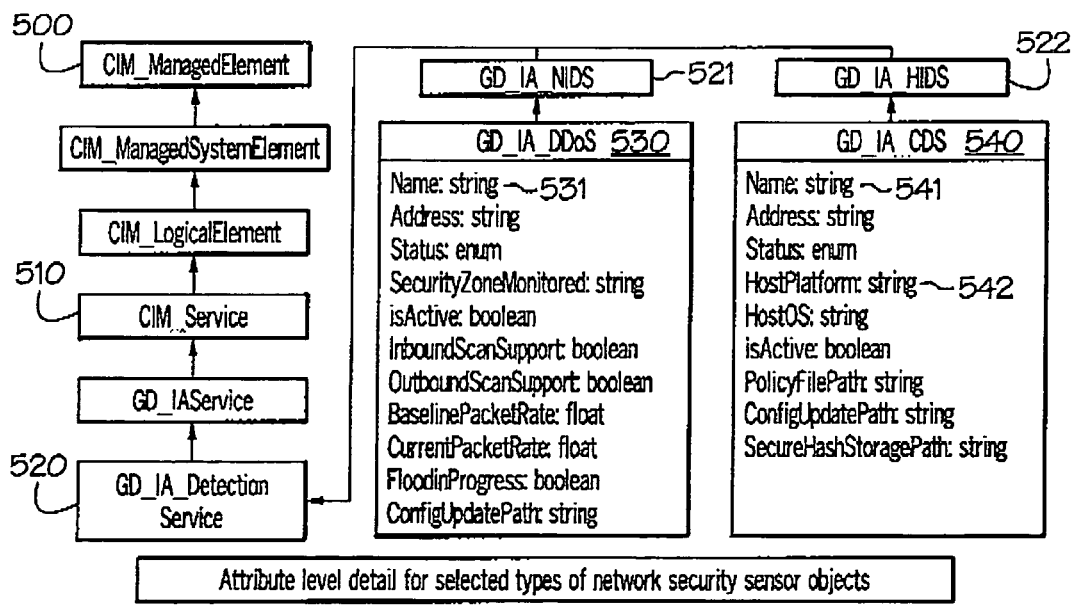
FIG. 5 is a block diagram illustrating the relationship between the network security fault analysis tool and network management and network security correlation engines in an embodiment of the present invention.

FIG. 5 shows a simplified class hierarchy and attribute level detail for the DDOS 530 and CDS 540 sensors corresponding to DDOS 423 and CDS 424 classes of FIG. 4. Because of the object oriented nature of the CIM model, many of the attributes can be inherited from classes higher in the hierarchy. For example, the name attribute 531, 541 should be an attribute of the root managed element 500 level. Other attributes are actually relationships. The HostPlatform attribute 542 of the CDS class 540 represents a relationship to the object representing the host platform running the CDS.

2. Security Topology for the Network Security Domain

Once a model has been developed, the present invention can create a security topology based on instantiating specific instances of objects defined by the security model in order to apply the fault analysis tool of the present invention to the security topology. In the preferred embodiment, the security topology based on the security model is usually created by processing events from various sources which may include, but are not limited to, syslog events, text logfiles, and Simple Network Protocol (SNMP) traps. Additionally, the system may interface in a modular fashion with existing tools that process events (e.g. vendor-specific managers or collectors), rather than processing events directly from the sensors themselves. As the network is discovered, security events, devices, and other network security domain components are mapped into their generic model definitions, creating specific instance of those objects. For example, when an intrusion detection system, specifically a CDS sensor, is detected on the network, an instance of a CDS 424 of FIG. 4 may be instantiated, which also corresponds to an analyzer 210 of FIG. 2. Models may interface with systems with different vendor proprietary software/equipment through the use of modular adapters. Typically, an adapter is software written to interact with a specific vendor proprietary software/equipment and the system. Adapters usually take input from one application or network service and format the output in such a way that the target application will be able to understand it. An embodiment of the invention may use adapters to aid in event collection for the building a topology for the network security domain. Adapters parse information received from network devices to obtain information about the security topology. Such information includes the high-level information of FIG. 2 such as the reporting sensor 210, the attack 230 type, attack source 240, and the target host 240 and/or service 250 under attack. This information is used to create instances of specific objects described above in FIGS. 4 and 5. Once a topology is established, the present invention can then examine the connections and relationships of the instances to each other, and perform analysis to determine security root causes and impacts.

3. Correlating Information in the Network Security Domain

In the preferred embodiment, the network security fault analysis tool of the present invention uses the previously defined security topology to correlate information in the network security domain. The preferred embodiment uses SMARTS InCharge to generate a codebook of symptoms and problems which typically identifies which symptoms are caused by a particular problem by using the security topology based on the network security model. This codebook is an example of the causality matrix. The codebook is used for determining the root cause of any problem. The symptoms can be various events in the system. Problems are defined by a set of symptoms. After analyzing the symptoms, the present invention can ascertain the most likely problem or problems. This methodology is similar to that used in a medical diagnosis of a patient. Unlike a rule-based system, the present invention does not need an exact match or a complete set of information to determine a problem. Based on the known symptoms, the codebook can find the closest match and determine the problem. The present invention can be particularly useful in situations where a certain problem or an unrelated problem may block certain symptoms from being recognized. Although the preferred embodiment uses SMARTS InCharge codebook technology, the present invention could use any extendable CIM-based or other object-oriented fault analysis tool that allows faults and their associated events to be defined.

Because the security model is generated independently of any specific topology, as events signal changes in the topology, the codebook can adapt, and the security model need not be changed. In conventional rule-based systems when the network changes, a system administrator usually has to change the rules and definitions whenever security devices are added or removed to maintain a properly functioning system. With the present invention, as the network changes, the network security system can automatically change the security topology and adapt the codebook accordingly because the security model can stay the same. In other words, because the security model does not change, devices of all types can be added or removed from the system as long as the device has been defined in the security model. The present invention would simply remove or add instances of already defined objects, and update their relationships to other objects in the topology.

4. Cross-correlation of the Network Management and Network Security Domains

The above explanation details the application of correlation technology to the single domain of network security. However, the present invention is capable of correlating across the domains of network management and network security. Preferably, the present invention would cross-correlate information in the security topology with physical machines and logical services in the network topology or vice versa. In the preferred embodiment, cross-correlation is the method by which the individual servers diagnose root causes for their specific domains, and the network security fault analysis tool (e.g. in the preferred embodiment, a higher level server) receives the input from both these domains and can produce the root cause based on that input for the total network picture. This mechanism allows operators to view root causes in the network as they affect their responsibilities. Thus, a particular operator can configure the present invention to automatically undertake a particular action or display the information she wanted whether it be only security, only network management, or a combination of both.

Figure 6:
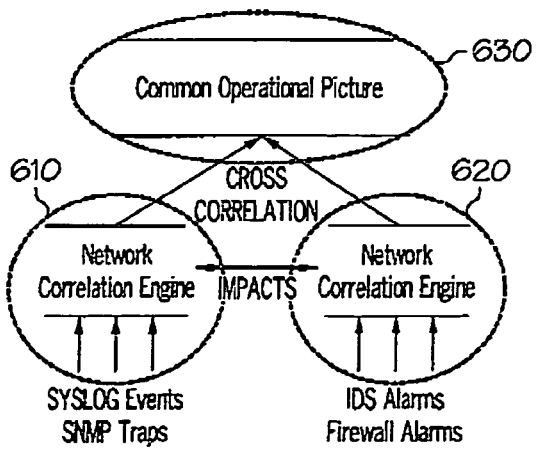
FIG. 6 is a block diagram of an example of an implementation of the present invention.

FIG. 6 shows an embodiment of the interaction between domains in an embodiment of the present invention. Network correlation engine 610 (developed using conventional methods) manages network information about the system. Security correlation engine 620 (developed using the above disclosed description), manages security information about the system. Information from both engines are sent to the network security fault analysis tool 630 which can correlate the received information to provide a common operational picture of the entire network. While the network correlation engine 610 can operate independently from the security correlation engine 620 and vice versa, information from one engine can impact another. For example, if a security event is recorded, the network security fault analysis tool 630 can correlate that security event to a network event recorded at a similar time. The cross-correlation can aid an operator in more accurately diagnosing problems or assist in preventing future problems. The components of FIG. 6 are software programs that can be run on any server. Additionally, a large network could have multiple components running. If a company has multiple sites consisting of multiple subnets per site, each site could run its own network correlation engine 610 and security correlation engine 620. Each site's engines would report to a single network security fault analysis tool 630 at the company's main network operations center (NOC). The NOC network security fault analysis tool 630 could then correlate and display a common operation picture of all network security and management information across all of the company's sites.

In addition to the ability to automatically cross-correlate the various domains to a common operational picture, the present invention allows an operator to view the complete picture of network and security status in a single location, as opposed to some conventional methods where an operator would have to monitor multiple screens and mentally put the picture together. For example, in a conventional system when a security alert occurs, the security operator may see the alert in the context of the security status of the network. If the alert impacts an operational asset (i.e., an attack disables a mail server), the network operators, in a conventional system, may see this as a result of the server being unavailable. In the preferred embodiment, an operator would automatically be presented with a combined picture, and be shown that there is a security event occurring, regardless of whether or not it impacts any operational assets. In addition, the operator can specify which type of information they would like to see, whether all of the available information or only a particular subset that is of interest to the operator. Because an operator may only be interested in some of the information in a system, the present invention can focus only on that information when cross-correlating, reducing the overhead.

Figure 7:
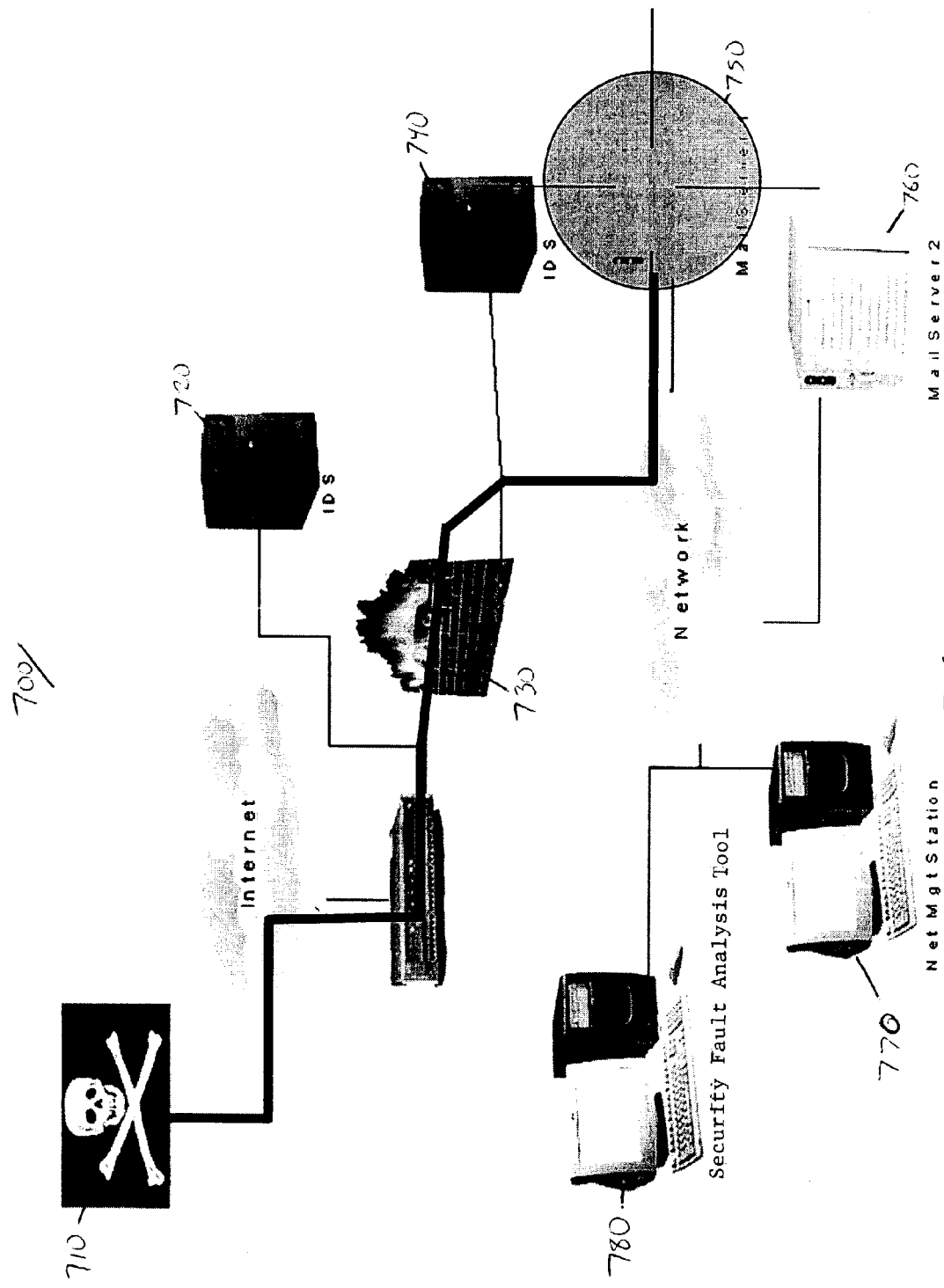
FIG. 7 illustrates an embodiment of the present invention in operation.

An embodiment of the present invention is shown in FIG. 7. System 700 comprises intrusion detection system 720 outside firewall 730, intrusion detection system 740 inside firewall 730, mail sewer 750, mail sever 760, a network management station 770, and network security fault analysis tool 780.Attacker 710 resides somewhere outside system 700. Attacker 710 sends a denial of service (DoS) attack to mail server 750 to disrupt the mail service. Intrusion detection system 720, firewall 730, and intrusion detection system 740 can detect the attack. If intrusion detection system 720 and intrusion detection system 740 both detect the attack, the present invention would ten know that the firewall was unable to prevent attacker 710 from penetrating system 700. Because the attack successfully traversed the firewall, it could disable mail server 750. A successful attack on mail server 750 and the events leading to the attack would be reported and logged by network security fault analysis tool 780.

The security domain tools would be able to detect the attack on system 700 and the network management tools would be able to determine that mail server 750 is inoperable. Using the recorded events leading up to the attack (detected by intrusion detection systems 720 and 740 by attacker 710, penetration through firewall 730 by attacker 710, and the failed mail server 750 which was the target of attacker 710), the present invention can cross-correlate this information (e.g. the network management and security events) to determine that there was a DoS attack on a mail server. Using the network topology, the present invention can then determine if any other host, such as mail server 760 would be susceptible to the same or similar attack. For example, the network security fault analysis tool 780 may know that the mail server 750, which resides inside of firewall 730, was attacked and disabled by attacker 710. Using this information (e.g. from the network security domain) and information about the network topology (e.g. from the network management domain), the network security fault analysis tool 780 can determine that there is another mail server in the network, i.e. mail server 760, hosting the same software revisions, that also resides behind firewall 730 and that it would also likely be susceptible to an attack by attacker 710. The present invention can then respond appropriately, for example, by notifying an operator of the problem and vulnerability of future attacks or triggering an automated response mechanism.

With the present invention, events can be normalized because of the object-oriented nature of the network security and network management model and the use of sub-classes and inheritance. Normalizing events allows the present invention to identify the impact of those events on the entire managed network, not just their impact on a particular domain. For example, the conventional network management tool could log the activity shown in FIG. 7 as a failed mail server, and the security tool could log this activity as an attack. In the present invention, this activity would typically be logged as a single activity, e.g. a denial of service attack on a mail server, and the present invention could automatically provide the necessary information to a specific system function or an operator. Thus, the present invention is often more efficient than conventional security management tools because it can normalize attacks and other activity within the network. In some instances, such consolidation of information could lead the system or the operator to make proper adjustments to avoid similar problems in the future, whereas without cross-correlation of the information the operator might be unaware of a problem, the true cause of the problem, future risks, or a manner to correct the problem.

Depending on the particular system or manager thereof, the present invention can be configured to recognize only particular events, devices or problems. Events, devices or problems may or may not be relevant, depending on the type of system or domains being monitored. Furthermore, an operator may wish to ignore certain events or problems. With the present invention, such information need not be analyzed. The present invention is dynamic and can be changed, in real-time if necessary, to accommodate many different implementations or changes thereto. Also, this flexibility can reduce the complexity, improve efficiency, and the overall speed of the system.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A computer-implemented method comprising:

defining a network security model having objects representing network security components and including one or more relationships among said network security components;

developing a network security topology of said network security components by instantiating specific instances of objects defined by said network security model;

correlating, by a security correlation engine, network security domain information among one or more network security components in said network security topology;

sending, by the security correlation engine, the network security domain information to a network security fault analysis tool;

correlating, by a network correlation engine, network management domain information among one or more network management components in a network management topology;

sending, by the network correlation engine, the network management domain information to the network security fault analysis tool;
receiving, by the network security fault analysis tool, the network security domain information and the network management domain information, wherein the network security fault analysis tool is separate from the security correlation engine and the network correlation engine;
automatically cross-correlating, by the network security fault analysis tool, the network security domain information with the network management domain information to determine a root cause for a detected problem;
automatically producing a common operational picture that includes a combination of the network security domain information and the network management domain information; and
displaying the root cause and the common operational picture on a network management station.

2. A computing system comprising:
at least one computer adapted to execute
a network correlation engine software program, which when executed, is to correlate network management domain information, and to send the network management domain information to a network security fault analysis software program,
a security correlation engine software program, which when executed, is to correlate network security domain information, and to send the network security domain information to the network security fault analysis software program, and
the network security fault analysis software program, which when executed, is to receive the network management domain information and the network security domain information, to automatically cross-correlate the network management domain information and the network security domain information, to automatically produce a common operational picture that includes a combination of the network security domain information and the network management domain information, and to display the common operational picture on a network management computer, wherein the network security fault analysis software program is separate from the security correlation engine software program and the network correlation engine software program.

3. The system of claim 2, wherein the network management domain information includes at least one of network management events, network devices, and network problems.

4. The system of claim 2, wherein the network security domain information includes at least one of security events, security devices, security problems, and security policies.

5. The system of claim 2, wherein the network security domain information includes malicious services.

6. The computing system of claim 2, wherein the at least one computer further is adapted to execute a software program to generate a security topology.

7. The computing system of claim 6, wherein the at least one computer further is adapted to execute a software program to automatically change the security topology based upon changes in the network.

8. The system of claim 7, wherein the changes include adding devices to the network.

9. The system of claim 7, wherein the changes include removing devices from the network.

10. A computer-implemented method comprising:
recording, by a network correlation engine, network management domain information that includes a network event;
sending, by the network correlation engine, the network event to a network security fault analysis engine;
recording, by a security correlation engine, network security domain information that includes a security event;
sending, by the security correlation engine, the security event to the network security fault analysis engine;
receiving and automatically cross correlating, by the network security fault analysis engine, the network event and the security event when they were recorded at a similar time, and automatically producing a common operational picture that includes the network event and the security event, wherein the network security fault analysis engine is separate from the security correlation engine and the network correlation engine; and
causing information regarding the common operational picture to be displayed on a network management station.

11. The method of claim 10, wherein the at least one network event includes at least one of a network management event, a network device, and a network problem.

12. The method of claim 10, wherein the at least one security event includes at least one of a security event, a security device, a security problem, and a security policy.

13. The method of claim 10, further comprising:
generating a security topology of the network.

14. The method of claim 13, further comprising:
changing the security topology upon removing devices from the network and adding devices to the network.

15. The method of claim 10, further comprising:
determining a source for the security event.

16. The method of claim 15, wherein the source is internal to the network.

17. The method of claim 15, wherein the source is external to the network.

18. The method of claim 15, wherein the source is a malicious source.

19. A computer-implemented method performed in a system that includes at least one mail server, the method comprising:
recording, by a network management tool of the system, first information regarding a network event that has occurred, wherein the network event includes a first mail server of the system becoming inoperable;
sending, by the network management tool, the first information to a network security fault analysis tool of the system;
recording, by a security domain tool of the system, second information regarding a security event that has occurred, wherein the security event includes an attack on the first mail server;
sending, by the security domain tool, the second information to the network security fault analysis tool;
automatically correlating, by the network security fault analysis tool, the first information and the second information to produce a cross-correlation, wherein the network security fault analysis tool is separate from the security domain tool and the network domain tool;

determining, by the network security fault analysis tool based on the cross-correlation, that the attack on the first mail server occurred; and causing information regarding the cross-correlation to be displayed on a network management station.

20. The method of claim 19, further comprising:

an intrusion detection system detecting the attack; and the intrusion detection system reporting the attack to the security domain tool.

21. The method of claim 19, further comprising:

determining if a second mail server of the system is susceptible to a similar attack; and when a second mail server is susceptible to the similar attack, notifying an operator of the system of the information regarding the similar attack.

* * * * *